MAGNETIC MATRIX MEMORY SYSTEM

Filed Aug. 27, 1962 2 Sheets-Sheet 1

INVENTOR
DAVID J. CRAWFORD

BY [signature]

ATTORNEY

United States Patent Office
3,209,337
Patented Sept. 28, 1965

3,209,337
MAGNETIC MATRIX MEMORY SYSTEM
David J. Crawford, Poughkeepsie, N.Y., assignor to International Business Machines Corporation, New York, N.Y., a corporation of New York
Filed Aug. 27, 1962, Ser. No. 219,706
8 Claims. (Cl. 340—174)

The present invention relates to magnetic matrix memory systems, and particularly to driving and sensing means for such systems.

Magnetic matrix memory systems are well-known in the data handling arts. Systems of this type employ a plurality of bistable magnetic storage elements in coordinate arrays of two or three dimensions. Excitation windings are provided for the magnetic elements along the several coordinate dimensions. There is a separate group of excitation windings for each coordinate dimension, and individual elements, or groups of elements are selectively excited by combinational energization of the windings of different groups.

The storage elements employed in magnetic matrix memory systems have usually taken the form of toroidal cores of magnetic material exhibiting generally rectangular hysteresis loop characteristics. The excitation windings are coupled to the cores so that fields produced thereby switch certain selected cores to desired remanence points on their hysteresis loops. More recently magnetic matrix storage systems employing thin magnetic films, of either open or closed flux path configuration, have been developed. These elements employ a different principle of operation than the rectangular hysteresis loop toroids, in that they take advantage of a uniaxial anisotropic characteristic of the storage element and are controlled by fields some of which act at right angles to the preferred axis of magnetism rather than in direct aiding or opposing relation as in the case of the conventional toroids.

Notwithstanding the fundamental differences in operation of conventional toroids and thin film elements, matrix memory systems employing both kinds of elements have many similarities and are subject to similar difficulties. In matrix memory systems employing either magnetic cores or thin films, the storage elements are arranged in a coordinate array, and coordinate selection techniques are employed to store and retrieve information in the array. Excitation windings are provided for the storage elements along coordinate axes of the array, one separate coordinate group for each coordinate axis, and individual elements are controlled by energization of windings from different groups. One coordinate axis is employed for controlling the value of information stored in the array and the other axis or axes are employed to select the location within the array where information is to be stored. Thus in a two dimensional system, the storage elements, be they cores, thin films or any other equivalent elements, are arranged in an array of row and column coordinates. The windings of one coordinate group, for example, the rows, are used to control the binary values stored in the array while the windings of the other coordinate group are used to select the location within the array where information is to be stored. Entry of information requires that windings of both coordinate groups be energized. Read-out of information requires energization of windings from only one group (the location identifying group) but means must be provided along the other coordinate to sense the binary values read from the array. This latter means usually includes a separate set of coordinate windings, called sense or read-out windings, which are coupled to the storage elements in the same manner as the windings of the information value controlling set. Voltages induced in the sense windings during read-out are amplified and interpreted by sense amplifiers coupled to the windings.

Three-dimensional systems are similar in concept to the two-dimensional system just described. In three-dimensional systems, however, two coordinate dimensions are employed for specifying locations for storage in the array and the third is used for information control during entry operations and for detecting information values in read-out operations.

Ordinarily in both two and three-dimensional systems, two independent sets of windings are provided for the coordinate dimension employed for information control and sensing. Both sets couple the storage elements in the same general way. One set is used only during write-in operations for information control and the other set is used only during read-out operations for information sensing.

It has long been recognized that since the information control and sense windings are never used at the same time, both the information control and sensing operations might be handled by a common winding set. A common information control and sensing system offers many advantages including cost reduction, ease of manufacture, and general simplification of the memory system. In modern memory systems which employ miniaturized components the removal of one set of windings provides additional benefits. For example, in systems using toroidal cores, a decrease in the number of windings permits use of significantly smaller cores. In thin film memory systems, reduction in the number of winding sets permits closer and more effective coupling between the thin film elements and the remaining windings.

Many difficulties are encountered in providing an efficient common information control and sensing system. One of the greatest problems is that of insuring effective isolation between the driving and sensing circuitry connected to the common windings without impairing the efficiency of the system for either purpose. Prior common control and sensing systems have not solved this problem, and for that reason have not enjoyed wide usage. Accordingly, it is the purpose of this invention to provide a common information controlling system which does solve this and other related problems.

It is the object of the present invention to provide, for a magnetic matrix memory, an improved common information control and sensing system.

More specifically, it is the object of this invention to provide, for a magnetic matrix memory, an information control and sensing system which employs a common winding set for both information control and information sensing and which provides efficient isolation between the control and sensing circuitry without impairing the efficiency of the system for either operation.

It is an object of this invention to provide a common information control and sensing system usable with magnetic memory systems of two or more than two dimensions.

It is also an object of the invention to provide a common information control and sensing system capable of operation with high speed memory systems which operate in submicrosecond speed ranges.

In the prior and copending application Serial No. 133,875, filed August 25, 1961, and now U.S. Patent No. 3,142,049, by this inventor and assigned to the assignee hereof, there is disclosed a memory array sensing system which prvoides improved sensing efficiency by minimizing the adverse effects of noise generation, reflections and delays which are present in the system. This improved sensing system employs sense windings which are terminated at each end in their characteristic impedances. Sense signals induced in a winding are applied to amplifying circuitry connected across the terminating impedance at one end only. The present invention employs the improved sensing system disclosed in the above-mentioned application as a common information control and sensing system. A novel circuit arrangement including a diode and a bias source is provided for each sense winding to couple both driving and sensing circuitry to the winding in such a manner that efficient isolation is maintained between the driving and sensing circuitry without impairing the characteristics of the winding for sensing or for driving purposes.

The foregoing and other objects, features and advantages of the invention will be apparent from the following more particular description of the preferred embodiments of the invention, as illustrated in the accompanying drawings.

Figure 1:
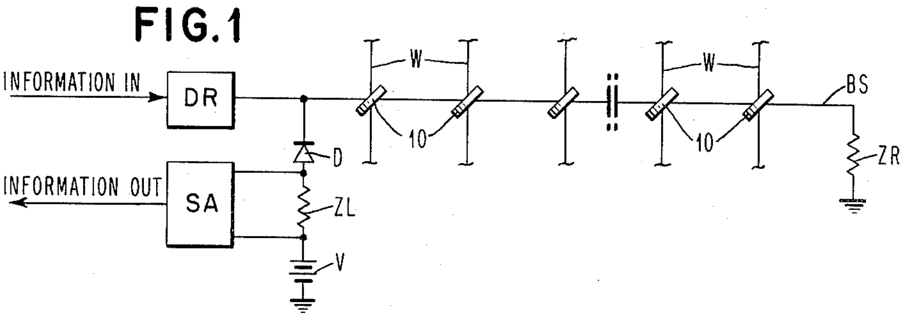
FIG. 1 is a fragmentary schematic illustration showing the present invention in elemental form.

Referring now in detail to the drawings, there is shown in FIG. 1 an elemental circuit which comprises a single row of bistable magnetic storage cores 10 coupled to a common information controlling and sensing system embodying the present invention. Each of the cores 10 is provided with a separate vertically disposed word selection winding W, and all are coupled to a common information control and sense winding BS (commonly referred to as a "bit-sense" winding). Any individual core 10 may be individually switched from an initial or reference stable magnetic state to the opposite state by proper combinational energization of the windings W and BS in accordance with any of several known coordinate selection techniques. The most common technique consists of coincidently applying half select currents to the winding W coupling the selected core and to the winding BS, so that the selected core receives sufficient current to switch from one state to the other while all others only receive half that amount.

The core thus switched may be returned to the initial state by applying a full select current of proper polarity to the winding W coupling that core. Upon returning to the initial state the core will induce a voltage in the winding BS which may be detected as an indication that the core has switched.

In the copending application, Serial No. 133,875, mentioned above, there is disclosed an improved memory array sensing system which minimizes the adverse effects of noise generation, delays, reflections, etc. to provide improved sensing efficiency. The present invention incorporates this improved sense winding arrangement. Accordingly, the winding BS, which has the characteristics of a transmission line, as is well-known, is terminated to reference potential at each end. The terminating means at the right hand end consists of a resistor ZR having an impedance equalling the characteristic impedance of the winding BS. At the left hand end of the winding BS, an impedance member ZL is provided. The impedance ZL is coupled between the winding and reference potential in series with a diode or other unidirectional conducting device D and a bias voltage source V, the purposes of which will be explained later herein. A sense amplifier SA, which may be of conventional design, is connected across ZL to detect voltages appearing thereacross.

The impedance ZL is preferably selected to have a value such that the combined impedance of ZL and D, when diode D is held slightly conductive as explained later, is approximately equal to the characteristic impedance of winding BS.

With the circuit arrangement just described, maximum sensing efficiency of the winding BS is realized. A voltage pulse induced at any point in the winding by flux change in a core 10 propagates what may be termed a half-signal in each direction along the winding. The half-signal travelling toward the right hand end is absorbed by terminating impedance ZR without reflection, while the half-signal travelling toward the left appears across ZL and is presented to the sense amplifier SA. Since the two ends of the winding are terminated in the characteristic impedance of the winding, no unwanted reflections are allowed to pass along the line and the difficulties in distinguishing the desired signal from reflections, etc., are prevented.

In addition, since only one half-signal is sensed and the other is absorbed at the opposite end of the line, the adverse effects of delays in signal propagation are minimized. While signals induced near the left end of the winding BS may reach the sense amplifier somewhat earlier than signals induced near the right hand end, the possibility of sensing two half-signals spaced in time, which is encountered in systems that employ an amplifier connected between the opposite ends of the winding, is avoided.

It should be noted that while it is important to terminate the end of winding BS remote from the sense amplifier in the characteristic impedance of the winding to absorb signals without transmitting reflections back toward the sense amplifier, it is not essential that the left end of the winding BS be so terminated. Reflections transmitted from the left end of the winding will be absorbed by impedance ZR and will not be returned. Therefore, if sensing conditions require ZL to have a value other than one which will permit termination in the winding's characteristic impedance, for example, a higher value, such different value may be employed.

When the winding BS is employed for information control purposes, it is necessary that the winding have the appearance of a drive line. Examination of FIG. 1 will show that excepting for the terminating and sensing circuitry at the left end, the winding BS is well suited for use as a drive line. A driver DR, which may be any suitable current pulse generator, is coupled to the left end of the winding in common with the terminating and sensing circuitry so that current pulses of proper magnitude, polarity and duration may be transmitted through the winding and impedance ZR to reference potential. Termination of the right end of the winding BS in the characteristic impedance provides the same benefits for the driving operation as for the sensing operation.

For an efficient system, however, it is essential that isolation be maintained between the driver DR and the terminating and sensing means ZL and SA. It is undesirable from the driving standpoint to supply current through ZL since such current performs no useful function and constitutes an unnecessary drain on the system. From the sensing standpoint, the application of large signals to the sense amplifier during drive time is highly undesirable because such signals overload the amplifier and necessitate a delay following the application of drive pulses to permit the amplifier to recover. Application of drive signals to the sensing circuit also, of course, creates unwanted noise.

Figure 2:
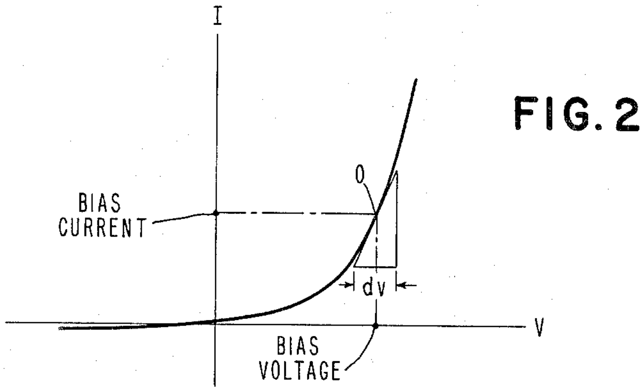
FIG. 2 is a voltage-current graph illustrating the characteristic curve of a unidirectional conducting device employed with the present invention.

To isolate the driving and sensing circuitry one from the other, the diode D and bias voltage source V are employed. Diode D is interposed between the terminating impedance ZL and winding BS as shown. It is poled to prevent drive signals generated by driver DR from passing through ZL to reference potential. While it is essential that diode D be present to block signals from driver DR during drive time, it is likewise essential that it be effectively absent during sensing operations to permit sense signals induced in the winding BS to appear across the impedance ZL and sense amplifier SA. The sense signals are, of course, much smaller than the drive signals, small enough so that the diode D appears as a high impedance even though the signals tend to bias it in the forward direction. To permit transmission of the sense signals to the amplifier SA without undue loss, the diode D is biased slightly in the forward direction by voltage source V. Referring to FIG. 2, which shows the current-voltage characteristic of a conventional diode, it will be seen that voltage source V biases the diode to an operating point O which is near the point on the characteristic curve at which the forward dynamic impedance of the diode becomes very small. The bias voltage is adjusted so that the dynamic impedance of the diode is considerably less than ZL, and is fairly constant over a voltage range *dv* (which is of the order of magnitude of a typical half-signal induced by a core 10).

In a typical situation where the characteristic impedance of the winding BS is about 150 ohms, the diode D may be forward biased with about 0.5 volt, to provide an impedance of approximately 15 ohms for a 50 to 100 millivolt variation (*dv*). In such a case ZL would be selected to have an impedance in the order of 135 ohms for proper termination of winding BS. It will be seen that in such a case substantially all of the half-signal induced by a core 10 will appear across ZL, with only about 10% loss in the diode D.

Forward biasing diode D to reduce the impedance thereof to small signals does not materially destroy its effectiveness in blocking the large signals by the driver DR, since it is heavily biased in the reverse direction by such signals. The small constant bias current flowing in the circuit is likewise tolerable since it is in the neighborhood of a few milliamperes, materially below the value necessary to disturb the magnetic condition of any core 10, or any thin film element which may be used in place of a core 10.

In the embodiment shown in FIG. 1 some disturbance of the sense amplifier is permitted during driving operations because of the fact that the diode is initially forward biased. Other disturbances during read-out operations, caused by noise produced from diverse sources, are also present. The circuit arrangement shown in FIG. 3 eliminates much of this noise by employing a balanced-to-ground sensing system wherein noise produced in two winding segments is eliminated by mutual cancellation.

Figure 3:
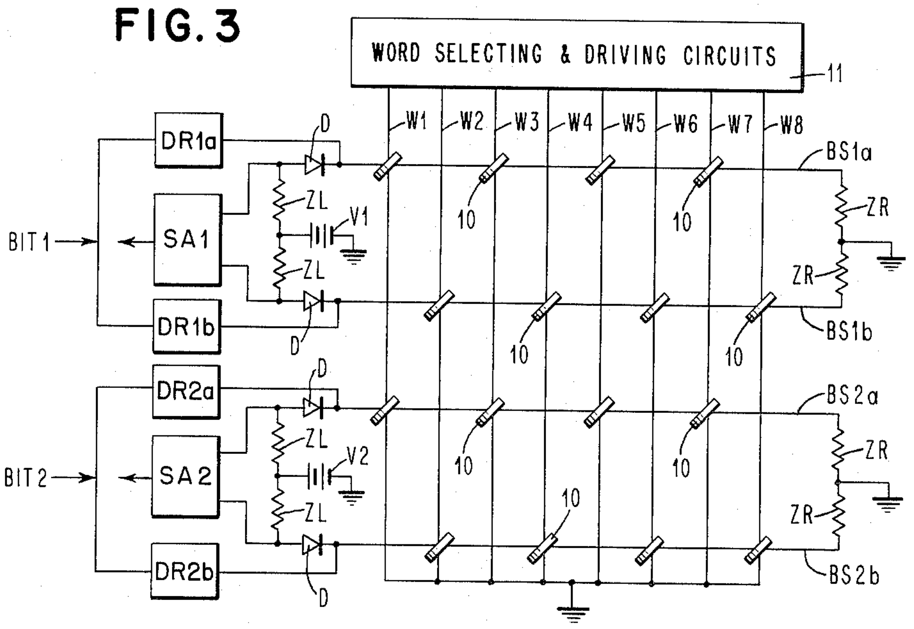
FIG. 3 is a fragmentary schematic illustration of a two-dimensional magnetic memory matrix employing one bistable memory element per bit of storage and embodying the present invention.

FIG. 3 discloses a two-dimensional memory matrix of the one-core-per-bit variety. While the fragmentary view shown includes only eight columns of cores and only two electrical rows, it will be understood that in actual practice many columns of cores and many rows will be provided. Each separate column of the matrix is provided with a vertical word selection winding W1–W8. The word selection windings are connected to word selecting and driving circuits indicated generally by the block 11. The selecting and driving circuits within the block 11 are well-known in the art and will not be described in detail herein. Suffice it to say that these circuits respond to word selecting and driving information to activate any selected individual word winding with current in either the read or write direction. In conventional two-dimensional matrix systems such as shown in FIG. 3, the read direction current is of "full select" magnitude, i.e. sufficient to drive the magnetic cores 10 coupled thereto from one remanence state to a reset remanence state. The write direction current supplied to the column windings is of a "half select" magnitude, that is to say, not sufficient, alone, to drive any core coupled to the associated winding from one state to the other but of such magnitude that two half select currents applied simultaneously will switch a core.

It will be observed that the cores 10 in adjacent columns are staggered with respect to each other so that each electrical row of cores 10 forms two physical rows. The purpose of this staggered arrangement is to accommodate the balanced-to-ground sensing system provided in accordance with this embodiment of the invention. Each physical row of cores is provided with a common bit-sense winding BS1*a*, BS1*b*, BS2*a* and BS2*b*. The windings BS1*a* and BS1*b*, taken together form a common driving and sensing system for the first electrical row of cores while the remaining bit-sense windings form a common driving and sensing system for the other electrical row.

Each common bit-sense winding BS1*a*–BS2*b* is provided with terminating impedances ZR and ZL and a diode D in the same arrangement as described in FIG. 1. A bias voltage source V1 or V2 is provided for each pair of bit-sense windings to forward bias the diodes D of that pair to the operating point O. Drivers DR1*a*, DR1*b*, DR2*a* and DR2*b* are provided for the several bit-sense windings in the manner previously described. A single sense amplifier SA1 or SA2 is also provided for each pair of bit-sense windings. In this embodiment, however, the amplifiers SA1 and SA2 are differential amplifiers and each is connected across the two impedances ZL of its respective pair of bit-sense winding, as shown in FIG. 3. Differential amplifiers are well-known in the art so no detailed description is included herein.

The arrangement just described has all of the advantages of the circuit of FIG. 1 and provides additional noise elimination as well. When information is to be entered into a core of the array of FIG. 3, both of the bit drivers for the electrical row containing that core are energized in common. As mentioned earlier, some disturbance is transmitted to the associated sense amplifier upon activation of a bit driver since the isolating diode is initially forward biased. In the embodiment of FIG. 3, the disturbances due to activating both bit-sense windings of a pair reach the amplifier simultaneously and cancel one another, leaving the differential amplifier unaffected. All other noise introduced into both bit-sense windings is eliminated by mutual cancellation. Desired information signals are not cancelled since they are induced in only one winding of a pair at a time. This balanced-to-ground arrangement provides a maximum of noise cancellation and enhanced signal to noise discrimination.

Figure 4:
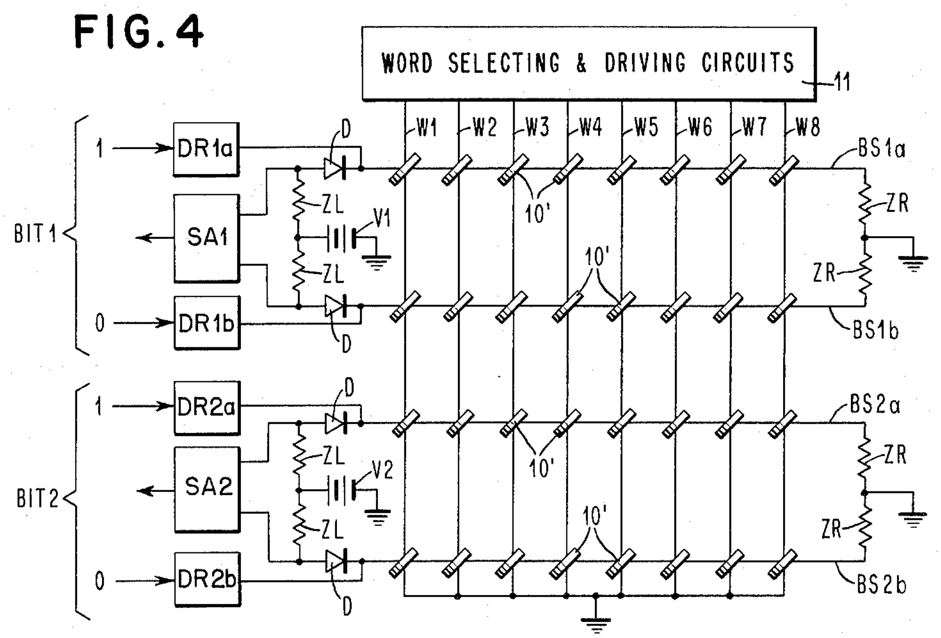
FIG. 4 is a fragmentary schematic illustration of a two-dimensional memory matrix employing two magnetic memory elements per bit of storage and embodying the present invention.

FIG. 4 illustrates the application of the present invention to a two-core-per-bit memory system, wherein individual bits of information are stored in terms of combinations of states of two bistable memory elements. A memory system of this type is described in detail in the IBM Journal of Research and Development, vol. 5, No. 3, July 1961, at pages 174–182.

In the memory of FIG. 4, eight word storage registers of two bit storage positions each, are illustrated. Since two magnetic cores are employed for each bit of storage, a magnetic core 10' is provided at the interesction of each word winding W1–W8 and each bit-sense winding. The cores 10' may differ from the cores 10 of FIGS. 1 and 3 in the rectangularity of the hysteresis characteristic as is known in systems of this type. However, except for this and the fact that the bit drivers DR1*a*–DR2*b* are independently controllable, the construction of the array of FIG. 4 is essentially the same as that of FIG. 3. Accordingly, like reference characters have been employed to designate the several elements.

In operation of a memory of the type shown in FIG. 4, information is written into a bit storage cell, for example, the cell comprising the cores 10' common to word winding W1 and bit-sense windings BS1*a* and BS1*b*, by coincident energization of the word winding W1 and one or the other of the bit-sense windings BS1*a* or BS1*b*. If a binary one is to be written BS1*a* is energized so that the upper core 10' of the selected pair is switched more than the lower core 10' of the pair. If a binary zero is to be written the winding BS1*b* is energized so that the lower core 10' of the pair is switched more than the upper core 10'. During this writing operation, the diodes D isolate the sense amplifier from the driving circuits in the manner explained earlier, so that unwanted noise is kept to a minimum. Upon read-out, both cores 10' of the pair are returned to their initial states by activation of the word winding W1. The flux changes experienced by the cores 10' induce voltages of like polarity in the windings BS1*a* and BS1*b*. Since one core experiences a greater flux change than the other, the voltage induced in one bit-sense winding will be larger than the voltage induced in the other. The half-signals transmitted to the impedances ZL will, accordingly, be of equal polarity but unequal magnitude. The net difference between them will be applied to the amplifier SA1. The polarity of this net difference signal depends upon which of the two signals is the larger, and, therefore, indicates the value of the information read from the cores. As in the case of the circuits of FIGS. 1 and 3, all noise which is common to the two windings BS1*a* and BS1*b* will be cancelled by the differencing action of the sensing circuitry.

Figure 5:
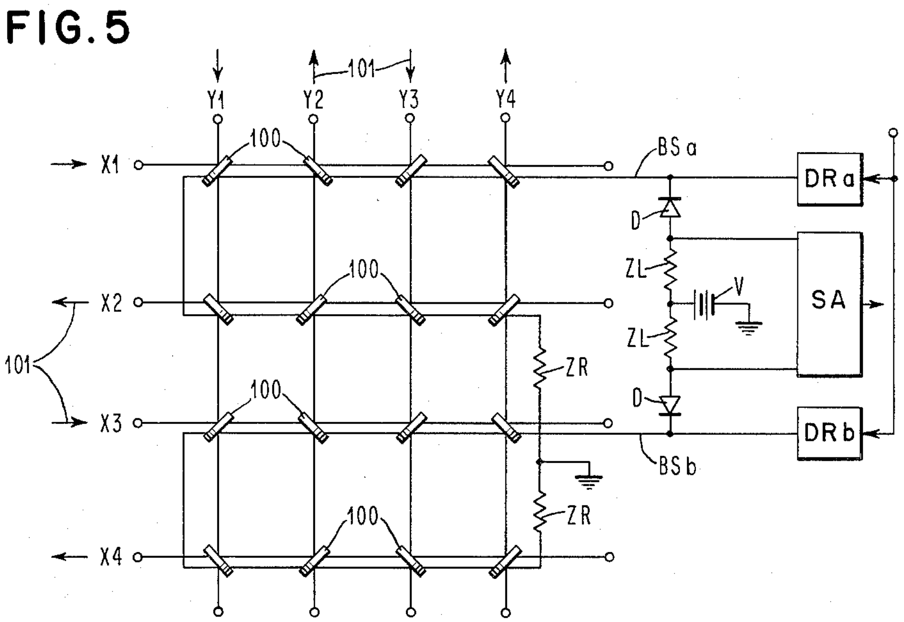
FIG. 5 is a fragmentary schematic illustration of one plane of a three-dimensional magnetic memory embodying the present invention.

FIG. 5 illustrates the application of the improved common information control and sensing circuit of this invention to a three-dimensional memory. As earlier described, a three-dimensional memory differs from a two-dimensional memory in that two coordinate dimensions are employed for specifying locations for storage, and the third is employed for information control and sensing. FIG. 5 shows a single bit plane of a three-dimensional array embodying the present invention. The plane comprises a plurality of bistable magnetic cores 100 arranged in rows and columns. Row and column selection windings X1–X4 and Y1–Y4 couple the cores along the several rows and columns. These windings are serially coupled to corresponding windings of other bit planes (not shown) to form row and column selection coils for the entire array. These coils are excited by row and column drive means (not shown) to drive a group of cores which comprises one corresponding core from each bit plane, to the set (binary one) state during write time and to the reset (binary zero) state during read-out time. The arrows 101 at the ends of the windings X1–X4 and Y1–Y4 indicate the direction of current flow therethrough during write operations.

Bit-sense windings BS*a* and BS*b* are provided for each bit plane to provide the information controlling and sensing function. These windings are provided with terminating impedances ZR, ZL, diodes D, voltage source V, differential amplifier SA and bit drivers DR*a* and DR*b* in the same manner as previously described. In this embodiment of the invention one of the pair of bit-sense windings couples half of the cores of the plane and the other couples the remaining half. The sense of coupling is the same for all cores so that bit current supplied by the drivers DR*a* and DR*b* produces a field in each core 100 in opposition to the fields produced by the selection windings during write operations. Since the selection lines which select a group of cores for storage of information automatically store binary ones in those cores, it is necessary to counteract the effect of these windings in planes where a binary zero is to be written. This is accomplished by energizing drivers DR*a* and DR*b* to apply current to the windings BS*a* and BS*b*. This current is insufficient, alone, to switch any core but is sufficient to prevent the selected core in the plane from being switched to the one state. The bit-sense windings thus control the value of information stored.

During the writing operations, the isolating diodes D prevent substantial current flow through the terminating impedances ZL, and the balanced-to-ground arrangement of the windings BS*a* and BS*b* provides cancellation of any minor common mode disturbance signals which appear across the impedance ZL, so that the differential amplifier SA is left unaffected.

At read-out time, the selection lines are activated so that read current is applied to a selected group of cores to switch them to the reset state. In those planes containing selected cores previously storing a binary one, one of the two bit-sense windings has a substantial voltage signal induced therein by the flux reversal of the core being reset. As previously described, half of this signal travels to the end of the winding coupled to the amplifier SA while the other half is absorbed by ZR. The half-signal travelling to the amplifier is passed by the forward biased diode D and appears across impedance ZL where it is detected by the amplifier SA. Noise which may accompany this signal is effectively eliminated since it is common to both windings BS*a* and BS*b* and is cancelled by the balanced-to-ground arrangement of the windings.

It should be apparent from the foregoing that the improved common information controlling and sensing system of this invention provides an effective means for utilizing a common winding set in a magnetic matrix memory for both the information controlling and sensing functions without any compromise of efficiency for either purpose. As described above, the system is equally well adapted for matrices of both two and three dimensions, and for systems of one element or more than one element per bit of storage. Although the invention is shown herein as applied to systems employing magnetic cores as storage elements, it will be obvious to those skilled in the art that it is equally applicable to systems employing thin magnetic films of either the open or closed flux path variety. Although the bit drive and sense signal levels are substantially smaller in thin film systems, the problems encountered in information control and sensing and the solutions to these problems are similar to those discussed hereinbefore.

While the invention has been particularly shown and described reference to preferred embodiments thereof, it will be understood by those skilled in the art that various changes in form and detail may be made therein without departing from the spirit and scope of the invention.

What is claimed is:

1. In a memory system which employs a plurality of bistable magnetic elements for storing information, and which employs windings coupling the elements through which driving signals are passed for controlling the magnetic states of said elements to enter and read out information, and which employs sense signals induced in windings coupling the elements by changes of the magnetic states of the elements to indicate information values upon read-out, the improvement in means for controlling the magnetic states of a plurality of elements in said system during entry of information and for sensing changes of state of elements in said plurality during read-out, comprising:

at least one common driving and sensing winding coupling a plurality of magnetic elements, first and second terminating means connecting the ends of said winding to a reference potential, drive means connected to one end of said winding in common with said first terminating means for passing drive signals through said winding, said first terminating means including a diode poled to be reverse biased by said drive signals and means for normally biasing said diode in the forward direction, said forward biasing means providing a bias level substantially smaller than and easily overcome by the drive signals, for presenting high impedance to said drive signals for substantially preventing said drive signals from passing through said first terminating means but for presenting low impedance to sense signals for permitting said sense signals to pass through said first terminating means, and sense signal output means coupled to one of said first and second terminating means.

2. In a memory system which employs a plurality of bistable magnetic elements for storing information, and which employs windings coupling the elements through which drive signals are passed for controlling the magnetic states of the elements to enter and read out information, and which employs sense signals induced in windings coupling the eelments by changes of the magnetic states of the elements to indicate information values upon read-out, the improvement in means for controlling the magnetic states of a plurality of elements in said system during entry of information and for sensing changes of state of elements in said plurality during read out, comprising:

at least one common driving and sensing winding coupling a plurality of magnetic elements, said winding having a determinable characteristic impedance with respect to a reference potential;

means for terminating one end of said winding to said reference potential in said characteristic impedance;

drive means connected to the opposite end of said winding for passing driving signals of predetermined polarity therethrough;

a unidirectional conducting device connected to said other end of said winding in common with said drive means and poled to block passage of said driving signals;

an impedance element connected between said unidirectional conducting device and reference potential;

biasing means in circuit with said unidirectional conducting device maintaining said device slightly conductive so that its impedance to sense signals is small compared with the impedance of said impedance element;

and amplifier means connected to said impedance element for detecting and amplifying sense signals.

3. The invention defined in claim 2 wherein the sum of the impedance of said unidirectional conducting device and the impedance of said impedance element is equal to or greater than the characteristic impedance of said winding.

4. In a memory system which employs a plurality of bistable magnetic elements for storing information, and which employs windings coupling the elements through which drive signals are passed for controlling the magnetic states of the elements to enter and read out information, and which employs sense signals induced in windings coupling the elements by changes of the magnetic states of the elements to indicate information values upon read-out, the improvement in means for controlling the magnetic states of a plurality of elements in said system during entry of information and for sensing changes of state of elements in said plurality during read-out, comprising:

at least one common driving and sensing winding coupling a plurality of magnetic elements, said winding having first and second end points and having a determinable characteristic impedance with respect to a reference potential;

a first impedance element connected between the first end terminal of said winding, said first impedance element having an impedance substantially equal to the characteristic impedance of said winding;

means connected to said second end point of said winding for supplying driving signals of predetermined amplitude and polarity through said winding;

a diode connected to said second end point of said winding;

a second impedance element having a predetermined impedance connected to said diode;

said diode being poled to prevent said driving signal pulses from passing through said second impedance element;

said diode being poled to prevent said driving signal pulses from passing through said second impedance element;

a bias means serially connected between said second impedance element and reference potential, said bias means providing a signal substantially smaller than said driving signals and of a polarity to forward bias said diode to a condition wherein its impedance to sense signals is less than the impedance of said second impedance element, so that sense signals induced in said winding may pass said diode to said second impedance element;

and sense signal detecting means connected to said second impedance element.

5. The invention defined in claim 4 wherein the sum of the impedance of said diode in its forward biased condition and the impedance element is substantially equal to or greater than the characteristic impedance of said winding.

6. The invention defined in claim 4 wherein the sum of the impedance of said diode in its forward biased condition and the impedance element is substantially equal to the characteristic impedance of said winding.

7. In a magnetic matrix memory system which employs a plurality of bistable magnetic elements for storing information, said elements being arranged in a coordinate array having at least two coordinate axes, the elements being arranged in a plurality of groups along each said axis, and which employs windings coupling the elements through which signals are passed for controlling the magnetic states of said elements to enter and read out information, and which employs sense signals induced in windings coupling the elements by changes of the magnetic states of the elements to indicate information values upon read out, the improvement in means for controlling and sensing information in said system, comprising for each group of elements along one of said axes:

a pair of common driving and sensing windings each of which couples half of the elements of the said group, and each of which has a determinable characteristic impedance with respect to a reference potential;

means terminating one corresponding end of each of said windings to said reference potential in its said characteristic impedance;

driving means connected to the other corresponding end of each said winding for supplying driving signals of predetermined amplitude and polarity through the winding;

a unidirectional conducting device connected to said other corresponding end of each winding in common with said driving means and poled to block passage of said driving signals;

an impedance element connected between each said unidirectional conducting device and reference potential;

bias means connected in circuit with said windings and said unidirectional conducting devices for maintaining both said unidirectional conducting devices slightly conductive so that their respective impedances to sense signals are small compared with the impedances of said impedance elements;

and differential amplifier means connected across said two impedance elements for detecting and amplifying voltage differentials thereacross.

8. In a magnetic matrix memory system which employs a plurality of bistable magnetic elements for storing information, said elements being arranged in a coordinate array having at least two coordinate axes, the elements being arranged in a plurality of groups along each said axis, and which employs windings coupling the elements through which signals are passed for controlling the magnetic states of said elements to enter and read out information, and which employs sense signals induced in windings coupling the elements by changes of the magnetic states of the elements to indicate information values upon read out, the improvement in means for controlling and sensing information in said system, comprising for each group of elements along one of said axes:

a pair of common driving and sensing windings each of which couples half of the elements of the said group, and each of which has a determinable characteristic impedance with respect to a reference potential;

means terminating one corresponding end of each of said windings to said reference potential in its said characteristic impedance;

driving means connected to the other corresponding end of each said winding for supplying driving signals of predetermined amplitude and polarity through the winding;

a diode connected to the other corresponding end of each said winding;

a pair of impedance elements each having a predetermined impedance serially connected between said diodes;

said diodes being poled to prevent driving signal pulses from passing through said pair of impedance elements;

bias means connecting a common circuit point between said impedance elements to reference potential, said bias means providing a constant signal substantially smaller than said driving signals and of a polarity to forward bias each said diode to a condition wherein its dynamic impedance to sense signals is less than the impedance of one of said impedance elements, so that sense signals induced in said windings may pass to said second impedance elements;

and differential amplifying means connected across said two impedance elements to detect voltage differences appearing thereacross.

References Cited by the Examiner

UNITED STATES PATENTS

| | | | |
|---|---|---|---|
| 2,900,624 | 8/59 | Stuart-Williams et al. | 340—174 |
| 3,092,812 | 6/63 | Rossing et al. | 340—174 |

FOREIGN PATENTS

| | | |
|---|---|---|
| 845,605 | 8/60 | Great Britain. |

IRVING L. SRAGOW, *Primary Examiner.*